United States Patent [19]

Yokomichi et al.

[11] 4,324,665

[45] Apr. 13, 1982

[54] PROCESS FOR RECOVERING BROMINE FROM WASTE LIQUID

[75] Inventors: Isao Yokomichi, Moriyama; Takeo Yamada, Nagoya; Akio Mohri, Yokkaichi; Kiyoshi Ota, Tokyo; Minoru Ikeda, Onoda, all of Japan

[73] Assignees: Ishihara Sangyo Kaisha, Ltd., Osaka; Nissan Chemical Industries, Ltd., Tokyo, both of Japan

[21] Appl. No.: 201,404

[22] PCT Filed: Sep. 7, 1979

[86] PCT No.: PCT/JP79/00239

§ 371 Date: Nov. 5, 1980

§ 102(e) Date: Oct. 28, 1980

[87] PCT Pub. No.: WO80/01905

PCT Pub. Date: Sep. 18, 1980

[30] Foreign Application Priority Data

Mar. 5, 1979 [JP] Japan .................................. 54-25204

[51] Int. Cl.³ .......................... C02F 1/76; C01B 7/09
[52] U.S. Cl. .................................. 210/718; 210/754; 423/505

[58] Field of Search ............... 210/718, 721, 723, 724, 210/726, 750, 754; 423/500, 504, 505

[56] References Cited

U.S. PATENT DOCUMENTS

| | | | |
|---|---|---|---|
| 2,359,221 | 9/1944 | Kenaga | 423/500 |
| 3,371,998 | 3/1968 | Schambra | 210/754 X |
| 3,401,203 | 9/1968 | Kralman et al. | 260/583 |
| 4,031,194 | 6/1977 | Ogawa et al. | 423/500 |

FOREIGN PATENT DOCUMENTS

50-15797 2/1975 Japan .
52-80658 7/1977 Japan .

*Primary Examiner*—Thomas G. Wyse
*Attorney, Agent, or Firm*—Cushman, Darby & Cushman

[57] ABSTRACT

This is a process for recovering bromine from a waste liquid formed in the production of an aniline derivative by ammonolysis of a nuclear substituted bromobenzene derivative with a halogen atom or a functional group. The waste liquid is first subjected to chlorine treatment in alkaline region to remove most part of ammonia and aniline derivatives, and then it is subjected to chlorine treatment in acidic region to recover bromine. The process does not involve danger of explosion accidents and can be smoothly operated.

5 Claims, No Drawings

PROCESS FOR RECOVERING BROMINE FROM WASTE LIQUID

TECHNICAL FIELD

The present invention relates to a process for recovering bromine, from a waste liquid formed in the production of anilines by ammonolysis of nuclear substituted bromobenzenes with at least one halogen atom or functional group or from a similar liquid. More particularly, it relates to a process for recovering bromine by liberating it through chlorine treatment of the above-said waste liquid or the like, which contains, in addition hydrogen bromide and another bromide, a small amount of the objective compound that has not been recovered, other anilines as byproduct, ammonia, ammonium salts, etc.

BACKGROUND ART

For producing nuclear substituted anilines, a process has been found to be industrially advantageous in which a nuclear substituted benzene is brominated and the bromine atom of the resulting substituted bromobenzene is replaced with amino group by ammonolysis. In this case, however, possibility of the recovery and reuse of bromine in the waste liquid has a significant effect upon successfulness of this process.

Techniques for recovering bromine from various waste liquids also have long been known. Particularly with respect to the bromine recovery processes by acidifying and treating with chlorine the waste liquids containing bromine compounds to liberate bromine, several industrial processes, including the well-known Kubierschy's process and the latest one that was disclosed in U.S. Pat. No. 4,031,194, have been proposed and widely put to practical use. However, because the above-said waste liquids, which are objects to be treated in this invention, contain aniline derivatives, ammonia, and ammonium salts, chlorine treatment of the waste liquids in acidic region not only causes insolubilization of the aniline derivatives resulting in difficulty in stable operation but also involves danger of formation and accumulation of explosive trichloroamine ($NCl_3$). Therefore, the recovery of bromine by chlorine treatment of the above-said waste liquid has been considered to be virtually impossible.

On the other hand, in the field of sewage treatment a process which comprises oxidative decomposition of ammonia contained in a small amount in a waste liquor by treating it with chlorine in an alkaline pH region is known as so-called Break Point Chlorination Process. However, the above-said waste liquid, which is the object of the treatment of this invention, contains such considerable amounts of aniline derivatives, ammonia, and ammonium salts that treatment thereof is troublesome and sometimes ammonia is still detected in the liquid even if it has been treated simply with chlorine in alkaline region, where the ammonia seems to have generated from the aniline derivatives.

DISCLOSURE OF INVENTION

The object of this invention is to provide an industrially advantageous process for recovering bromine, from a waste liquid formed in the production of an aniline derivative by ammonolysis of a nuclear substituted bromobenzene derivative with at least one halogen atom or functional group or the like, from which no industrially possible process of recovering bromine has so far been known. A further object of this invention is to provide an industrial process for the bromine recovery, safe and smooth in operation by eliminating detrimental effects of the aniline derivatives and ammonia which are remaining dissolved in the above-said liquid.

In the production of an aniline derivative by ammonolysis of a bromobenzene derivative nuclear substituted with at least one halogen atom or functional group such as hydroxyl group, amino group, nitro group, carboxyl group, sulfo group, or the like, recovery of the objective compound, that is, the aniline derivative by a suitable procedures such as fractionation, distillation, or the like leaves a waste liquid which contains by-produced aniline derivatives other than the objective product, ammonia, and ammonium salts as well as a small amount of the objective compound that has not been recovered. It has been found that said waste liquid or the like is treated by the first stage chlorination under specified conditions after addition of an alkaline material to insolubilize most parts of above-said aniline derivatives, while keeping the bromine compounds substantially not reacting with chlorine and dissolving in the liquid, whereby precipitation of said aniline derivatives in the next chlorination stage can be prevented and said aniline derivatives nuclear substituted with a halogen atom or functional group can form easy filtrable precipitates to be separated relatively easy in the first stage and at the same time most part of ammonia can be decomposed or volatilized. It has also been found that although sometimes a small amount of ammonia is detected in the filtrate obtained by removing the formed precipitate by filtration of the liquid which has been subjected to the first stage treatment, even a minute amount of trichloroamine formed can be decomposed thereby securing the safe recovery of high-purity bromine in a high yield by maintaining as homogeneously as possible the contacting or mixing state of the reaction system of the second stage chlorine treatment.

This invention relates to a process for recovering bromine, from a waste liquid formed in the production of an aniline derivative by ammonolysis of a nuclear substituted bromobenzene derivative with at least one halogen atom or functional group, or from a similar liquid, characterized by the following steps of (a)–(e):

(a) adding to said liquid an alkaline material in an amount of not less than 1.1 mole-times the combined ammonia content in said liquid;

(b) bringing the resulting liquid into contact with gaseous chlorine until the oxidation-reduction potential of the liquid becomes at least 400 mV;

(c) filtering and removing the formed precipitate;

(d) adding a mineral acid or an acidic waste liquid containing a mineral acid before or after the above-said step (c) to adjust the pH of the liquid to 3 or less; and then, (e) bringing the resulting liquid into contact with gaseous chlorine while allowing the liquid to flow down through a vertically long gas-liquid contact equipment, and simultaneously introducing steam to distill bromine out.

BEST MODE FOR CARRYING OUT THE INVENTION

The liquid to be treated in this invention contains; bromine compounds, for example, a bromide such as sodium bromide, potassium bromide, or ammonium bromide, and hydrogen bromide; additionally, nuclear substituted aniline derivatives with a halogen atom such as chlorine or bromine, or with a functional group such as hydroxyl group, amino group, nitro group, carboxyl group, sulfo group, or the like, said aniline derivatives including the aniline derivative that is the objective compound to synthesize and has not been recovered and remained, by-produced aniline derivatives, and the changed compounds therefrom; remaining ammonia and ammonium salts; and in many cases, it further contains the catalyst admixed in the synthesis and the changed compound therefrom. This liquid may be subjected to the treatment of this invention, directly as it is, or after it has been subjected to a pretreatment such as distillation, crystallization, filtration, or the like, to separate some parts of the constitutents therefrom, or after it has been mixed with a similar waste liquid of another organic synthesis.

In the treatment according to this invention at first an alkaline material is added to the liquid to be treated in an amount of not less than 1.1 mole-times that of the combined ammonia in this liquid. As the alkaline material, hydroxides and carbonates of alkali metals may be used, and ordinarily sodium hydroxide is most preferable. The alkaline material is presumed to be converted to the hypochlorite on introducing gaseous chlorine and participates in reaction. It serves to suppress the liberation of bromine in the first stage chlorine treatement and to precipitate aniline derivatives as relatively easy filtrable form. It may be added preferably in an excess amount of 1.2 to 1.5 mole-times that of the combined ammonia in the liquid.

The liquid thus made strongly alkaline can be subjected to distillation to remove at least parts of ammonia and aniline derivatives in the liquid prior to the chlorine treatment. This is industrially advantageous. Most parts of the liberated ammonia are distilled out and a part of the organic materials is distilled out with water by heating or steam blowing according to ordinary techniques of distillation or steam distillation, and they are collected and recovered. If precipitation of some constitutents takes place in the liquid in this distillation, it may be removed by filtration.

Then, gaseous chlorine is blown into the resulting liquid, and this treatment is continued until the oxidation-reduction potential of the liquid exceeds 400 mV. The gaseous chlorine is introduced into the liquid in a well dispersed state to contact with the liquid. When the chlorine treatment is continued until the oxidation-reduction potential is raised over 400 mV, preferably up to a voltage of 600 to 700 mV, the ammonia content will be reduced usually to a level of about 20 to 10 ppm or less and precipitation of the aniline derivatives can be completed. The pH value of the liquid is maintained in alkaline region by the presence of an excess alkali previously added, and hence neither bromine liberation nor trichloroamine formation occurs during this treatment.

The precipitate is removed by filtration from the chlorine-treated liquid, and the pH of the liquid is adjusted to 3 or less by addition of a mineral acid or a waste liquid containing a mineral acid before or after said filtration. The formed precipitate usually has such an improved filtration property that it can be filtered off by a usual filtration means. When a tarry material exists depending upon the composition of the liquid, fractionation is carried out by adoption of a suitable separating means or by the use of a filter aid. On addition of hydrochloric acid, sulfuric acid, or a waste liquid containing such an acid in order to adjust the pH of the liquid, occasionally precipitation takes place again; in this case it is preferable to filter off the precipitate after the pH adjustment. The filtrate is used for the latter stage chlorine treatment. The pH of the liquid is not more than 3, preferably not more than one. Since the liquid contains a hypochlorite formed by the former stage chlorine treatment, sometimes a reducing agent is added to the liquid before the pH adjustment to inhibit the liberation of bromine in the pH adjustment.

The liquid obtained through the treatments described above contains substantially all of the bromine content of the original liquid, whereas it contains substantially no aniline derivative that becomes insoluble in chlorine treatment. There are cases where an increase in ammonia content is observed in the liquid after storage depending upon the composition of the liquid or upon the conditions of the former stage chlorine treatment, but the effect of the existence of ammonia can be avoided by exercising care not to cause the formation and accumulation of trichloroamine in the latter stage chlorine treatment.

In the final bromine recovery step of this invention, the above-said filtrate is brought into contact with gaseous chlorine while allowing the filtrate to flow down in a vertically long, gas-liquid contact equipment and simultaneously steam is introduced, whereby bromine is distilled out. When by the use of a vertically long, gas-liquid contact equipment, preferably a packed tower, the liquid is brought into contact concurrently or counter-currently with gaseous chlorine while allowing the liquid to flow down, there is so little risk of forming local unhomogeneous part in the reaction system that neither formation nor accumulation of trichloroamine occurs even if a small amount of ammonia is present in the liquid feed. It is especially desirable to use a reactor having no dead space that is difficult to contact with the falling liquid and is liable to form unhomogeneous gas phase in the upper part of the tower. Even if trichloroamine forms, it would be quickly decomposed by immediate contact with bromine and bromine ions in the system, whereby dangerous accident can be prevented previously. One of the way suitable for recovering bromine has been described in the aforementioned U.S. Pat. No. 4,031,194, wherein a packed tower comprising an upper bromine-generating portion, a succeeding lower distillating portion and an outlet for bromine therebetween is used, and the liquid feed and gaseous chlorine are introduced at the top of the tower, steam is introduced at the bottom, and bromine is distilled out from the middle outlet port.

During chlorine treatment described above substantially no precipitate forms and the operation can be smoothly continued. The distillate is rectified according to an ordinary way and high-purity bromine can be recovered in a high yield.

EXAMPLE 1

By ammonolysis of 3,5-dichlorobromobenzene, 3,5-dichloroaniline was formed, and after separation of this objective compound, a waste liquid was obtained and used in this Example. It contained the following constituents:

| Constituents | % |
| --- | --- |
| 3,5-dichloroaniline | 0.5 |
| 3,5-diaminochlorobenzene | 0.8 |

-continued

| Constituents | % |
| --- | --- |
| Ammonium bromide | 17 |
| Ammonium chloride | 0.9 |
| Free ammonia | 12 |

To 100 parts by weight of this liquid 21 parts by weight of 48% sodium hydroxide aqueous solution was added. The mixture was subjected to reduced pressure distillation at 60° to 85° C., and 3,5-dichloroaniline and ammonia are distilled and collected. The remaining liquid was filtered to remove the formed precipitate giving a filtrate containing following constituents:

| Constituents | |
| --- | --- |
| 3,5-diaminochlorobenzene | 0.2% |
| Sodium bromide | 21.5% |
| Sodium chloride | 1.2% |
| Sodium hydroxide | 2.9% |
| Free ammonia | 72 ppm |

This liquid was fed into a tank having a gaseous chlorine inlet port at the bottom and being equipped with a stirrer. Gaseous chlorine was introduced while stirring, and introduction of chlorine was stopped when the oxidation-reduction potential of the liquid reached 700 mV. The molar ratio of the introduced gaseous chlorine to 3,5-diaminochlorobenzene in the liquid was 37. After a small amount of sodium sulfite was added to reduce the hypochlorite in the liquid, 32% hydrochloric acid was added to adjust the liquid pH to zero, and the precipitate was filtered off. In the filtrate 21 ppm of ammonia was detected, but after it was ascertained that on further introduction of gaseous chlorine into this liquid smooth treatment would be possible without precipitate formation, and the liquid was subjected to the bromine recovery treatment.

In the above-said chlorine treatment, some samples of the liquid were withdrawn in some stages before the oxidation-reduction potential of the liquid reached 700 mV, and the precipitates were removed in the same way as described above. The appearance of precipitate formation was observed on further introducing gaseous chlorine into the samples: in the case where the potential at sampling was below 400 mV, deposition of a tarry matter was observed, in the case where it was 400 mV, a minute amount of precipitates was observed. From these results it was proved that stopping of the chlorine treatment before 400 mV will cause some troubles in the bromine recovery step described below.

For bromine recovery, as a reactor was used a glass-made packed tower which had a diameter of 50 mm, a height of 1 m, a liquid feed inlet and a gaseous chlorine inlet at the top, a steam inlet and a drain outlet at the bottom, and a bromine distillate outlet at a nearly middle portion.

The above-said filtrate and gaseous chlorine in an amount of 1.25 times the theoretical amount of reaction to the sodium bromide content in said filtrate were introduced at the top of the tower and allowed to flow down with themselves brought into contact concurrently with each other. And by introducing 1 Kg/cm$^2$ steam at the bottom of the tower the liberated bromine was distilled and collected. Plugging of the tower was not observed at all and no trichloroamine was detected in the gas in the top of the tower.

The distillate was rectified and bromine of 99.3% purity was recovered. The yield of the bromine recovery was 93%.

EXAMPLE 2

To a waste liquid of m-nitroaniline production which contained 0.1% of aniline derivatives composed mainly of m-nitroaniline, 15% of potassium bromide, and 45 ppm of free ammonia, was added potassium hydroxide in an amount of 3 parts by weight per 100 parts by weight of said waste liquid.

Gaseous chlorine was introduced into this liquid in the same way as the preceding Example, the formed precipitate was removed, and thereafter the pH of the liquid was adjusted to one using dilute sulfuric acid. Further, this liquid was brought into contact with gaseous chlorine and steam in the same way as the preceding Example, to liberate bromine, which was effused and recovered. Rectified bromine was 99.5% in purity and the yield of recovery was 95%.

EXAMPLE 3

A liquid containing 0.4% of aniline derivatives including o-aminobenzoic acid and aniline, 0.1% benzoic acid, 10% of sodium bromide, and 0.3% of potassium hydroxide was treated in nearly the same way as Example 1, except that the former stage vacuum distillation was omitted, recovering bromine in a yield of 92%.

INDUSTRIAL APPLICABILITY

As described above, the process of this invention is useful to recover bromine, from the waste liquids formed in the production of aniline derivatives by ammonolyisis of nuclear substituted bromobenzenes, or similar liquids. It brings about direct merits by recovering bromine and other valuable constituents separatedly from the waste liquid, at the same time enhances economy of the overall process for producing aniline derivatives through ammonolysis, and moreover makes it possible to avoid detrimental effect of the waste on environment. Also, this process does not involve danger of explosion accidents, is operable smoothly and suitable for industrial practice.

We claim:

1. A process for recovering bromine, from a waste liquid formed in the production of an aniline derivative by ammonolysis of a bromobenzene derivative nuclear substituted with at last one halogen atom or functional group, or from a similar liquid, said process being characterized by containing the following steps:
   (a) adding to said liquid an alkaline material in an amount of not less than 1.1 mole-times the combined ammonia content in said liquid;
   (b) bringing the resulting liquid into contact with gaseous chlorine until the oxidation-reduction potential of the liquid reaches at least 400 mV;
   (c) filtering and removing the formed percipitate;
   (d) adding a mineral acid or an acidic waste liquid containing a mineral acid before or after the above-said step (c) to adjust the pH of the liquid to 3 or less; then,
   (e) bringing the resulting liquid into contact with gaseous chlorine while allowing the liquid to flow down through a vertically long, gas-liquid contact equipment, and simultaneously introducing steam to distill bromine out.

2. A process for recovering bromine from a waste liquid according to claim 1, wherein said process is characterized in that the liquid obtained in the above-said step (a) is subjected to distillation to remove at least part of ammonia and aniline derivatives in the liquid and subsequently is treated as in the above-said steps (b) to (e).

3. A process for recovering bromine from a waste liquid according to claim 1 or 2, wherein said process is characterized in that in the above-said step (a) an alkaline material is added in an amount of 1.2 to 1.5 mole-times the combined ammonia content in the liquid.

4. A process for recovering bromine from a waste liquid according to claim 1 or 2, wherein said process is characterized in that in the above-said step (b) gaseous chlorine is introduced until the oxidation-reduction potential of the liquid becomes a voltage of 600 to 700 mV.

5. A process for recovering bromine from a waste liquid according to claim 3, wherein said process is characterized in that in the above-said step (b) gaseous chlorine is introduced until the oxidation-reduction potential of the liquid reaches a voltage of 600 to 700 mV.

* * * * *